(12) United States Patent
Housser

(10) Patent No.: US 7,882,494 B2
(45) Date of Patent: Feb. 1, 2011

(54) APPARATUS AND METHOD FOR MANIPULATING VARIABLE STATES

(75) Inventor: Matthew Stephan Housser, Delta (CA)

(73) Assignee: Business Objects Software Ltd., Dublin (IE)

( * ) Notice: Subject to any disclaimer, the term of this patent is extended or adjusted under 35 U.S.C. 154(b) by 984 days.

(21) Appl. No.: 11/686,306

(22) Filed: Mar. 14, 2007

(65) Prior Publication Data

US 2008/0229285 A1  Sep. 18, 2008

(51) Int. Cl.
*G06F 9/44* (2006.01)
(52) U.S. Cl. ........................ 717/124; 712/227
(58) Field of Classification Search .............. 717/124, 717/129; 712/227
See application file for complete search history.

(56) References Cited

U.S. PATENT DOCUMENTS

| | | | |
|---|---|---|---|
| 6,785,884 B1 * | 8/2004 | Rieschl ..................... | 717/129 |
| 2005/0223363 A1 * | 10/2005 | Black-Ziegelbein et al. | 717/127 |
| 2006/0197764 A1 * | 9/2006 | Yang ........................ | 345/473 |
| 2006/0241961 A1 * | 10/2006 | Tsyganskiy et al. ........ | 705/1 |
| 2007/0168972 A1 * | 7/2007 | Bates et al. ................ | 717/124 |
| 2007/0168994 A1 * | 7/2007 | Barsness et al. ............ | 717/129 |

OTHER PUBLICATIONS

John Robbins, "Mini Dump Snapshots and the New SOS," [online], Microsoft Corp. © 2007, pp. 1-9, [retrieved on Jan. 22, 2007]. Retrieved from the Internet: URL: http://msdn.microsoft.com/msdnmag/issues/05/03/Bugslayer/.
The MathWorks: "Load," [online], The MathWorks, Inc. © 1984-2007, pp. 1-3, [retrieved on Jan. 22, 2007]. Retrieved from the Internet: URL: http://ww.mathworks.com/access/helpdesk/help/techdoc/matlab.html.
The MathWorks: "Save," [online], The MathWorks, Inc. © 1984-2007, [retrieved on Jan. 22, 2007]. Retrieved from the Internet: URL: http://www.mathworks.com/access/helpdesk/help/techdoc/matlab.html.
Microsoft: "ASP.NET QuickStarts Tutorial: Managing Application State," [online], Microsoft Corp. © 2002, pp. 1-5, [retrieved on Jan. 22, 2007]. Retrieved from the Internet: URL: http://samples.gotdotnet.com/quickstart/aspplus/doc/stateoverview.aspx.
Joel Murach, "Variable Monitoring with Autos, Locals, and Watch Windows," [online], iEntry Inc. © 1998-2007, pp. 1-3, [retrieved on Jan. 22, 2007]. Retrieved from the Internet: URL: http://www.devwebpro.com/devwebpro-39-20060912VariableMonitoringwithAutosLocalsandWatchWindows.html.
Microsoft: "What's New for Debugging Tools for Windows," [online],Microsoft Corp. © 2007, [retrieved on Jan. 22, 2007]. Retrieved from the Internet: URL: http://www.microsoft.com/whdc/devtools/debugging/whatsnew.mspx.
Visual FoxPro: "VFP Debugger Watch Window," [online], Visual FoxPro 1999, 1 page, [retrieved on Jan. 22, 2007]. Retrieved from the Internet: URL: http://fox.wikis.com/wc.dll?Wiki~VFPDebuggerWatchWindow~VFP.

\* cited by examiner

*Primary Examiner*—Wei Y Zhen
*Assistant Examiner*—Chih-Ching Chow
(74) *Attorney, Agent, or Firm*—Cooley LLP

(57) ABSTRACT

The invention includes a computer readable storage medium with executable instructions to run a segment of code and identify associated variables. The segment of code is stopped at a predetermined breakpoint and state values that correspond to the associated variables are identified. A variable is selected from the associated variables via a Graphical User Interface, where the selected variable has a variable state. The variable state is saved to a data store via the Graphical User Interface.

4 Claims, 6 Drawing Sheets

APPARATUS AND METHOD FOR MANIPULATING VARIABLE STATES

BRIEF DESCRIPTION OF THE INVENTION

This invention relates generally to manipulating variable states. More particularly, this invention relates to saving, replacing and comparing variable states via a Graphical User Interface.

BACKGROUND OF THE INVENTION

Variable state manipulation is a very important aspect of debugging software. Testers often need to compare variable states of instances associated with a segment of code in order to understand how changes in the segment of code affect the variable states. Being able to replace variable states with previously achieved variable states is also valuable as it allows the tester to control his environment where variable states may be randomized or otherwise inconsistent. Some development environments allow the tester to accomplish these tasks by writing additional code segments which save, replace and compare variable states, or by calling command line functions. Other environments allow copy, cut and paste actions on a list of current variable states. The concept of saving variable states requires the tester to copy the variable states from the development environment and paste them into a word processor, or record them on paper. However, these methods are tedious and inefficient, and in some cases require an intimate familiarity with the development environment to be used correctly.

In view of the foregoing, it would be advantageous to provide a system which allows the user to save, replace and compare variable states quickly and intuitively.

SUMMARY OF INVENTION

The invention includes a computer readable storage medium with executable instructions to run a segment of code and identify associated variables. The segment of code is stopped at a predetermined breakpoint and state values that correspond to the associated variables are identified. A variable is selected from the associated variables via a Graphical User Interface, where the selected variable has a variable state. The variable state is saved to a data store via the Graphical User Interface.

The invention also includes a computer readable storage medium with executable instructions to run a segment of code and identify associated variables. The segment of code is stopped at a predetermined breakpoint and state values that correspond to the associated variables are identified. A variable is selected from the associated variables via a Graphical User Interface, where the selected variable has a variable state. A saved variable state is accepted from a data source. The saved variable state includes a set of saved state values corresponding to a state of a previously run segment of code. An operation is triggered via a Graphical User Interface that either replaces a current state value with a saved state value or compares a current state value with a saved state value.

The invention also includes a computer readable storage medium with executable instructions to run a segment of code and identify associated variables. The segment of code is stopped at a predetermined breakpoint and state values that correspond to the associated variables are identified. A variable is selected from the associated variables via a Graphical User Interface, where the selected variable has a variable state. A saved variable state is accepted from a data source. The saved variable state includes a set of saved state values corresponding to a state of a previously run segment of code. An operation is triggered via a Graphical User Interface that replaces a current state value with a saved state value.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The following terminology is used while disclosing embodiments of the invention:

A breakpoint is a location in a code segment at which a debugger halts code execution and waits for a command. A breakpoint may be at a user specified line within the segment of code or the end of the code segment.

A development environment is a type of computer software that assists computer programmers in creating software. A development environment typically comprises a source code editor, a compiler and/or interpreter, build-automation tools and a debugger.

A drag-and-drop is the action of half-clicking on an item, dragging it to a different location or onto another item, and then releasing the input device. In general, it can be used to invoke many kinds of actions, such as copying or moving, or create various types of associations relating two items.

A half-click is a depression of a button without release prior to another action, e.g., a drag operation.

A hotkey is a key or set of keys on an input device that has a specific function in an application.

A right-click menu is a list of actions which can be performed on an item. This list appears when a user performs a half-click of the right mouse button on the item. An action can be selected from this list by hovering over the listed action and releasing the right mouse button.

Serialization is related to data storage and data transmission. Serialization is the process of saving an object onto a storage medium (e.g., hard disk, floppy disk, memory buffer) or transmitting it across a network connection link. Prior to saving or transmitting, the object is converted into a series of bits or a human-readable format (e.g., XML) and is saved or transmitted as such. The series of bits or the human-readable format can be used to create an object that is identical in its internal state to the original object. Serialization is useful for tasks such as making objects persistent, issuing remote procedure calls and distributing objects.

Figure 1:
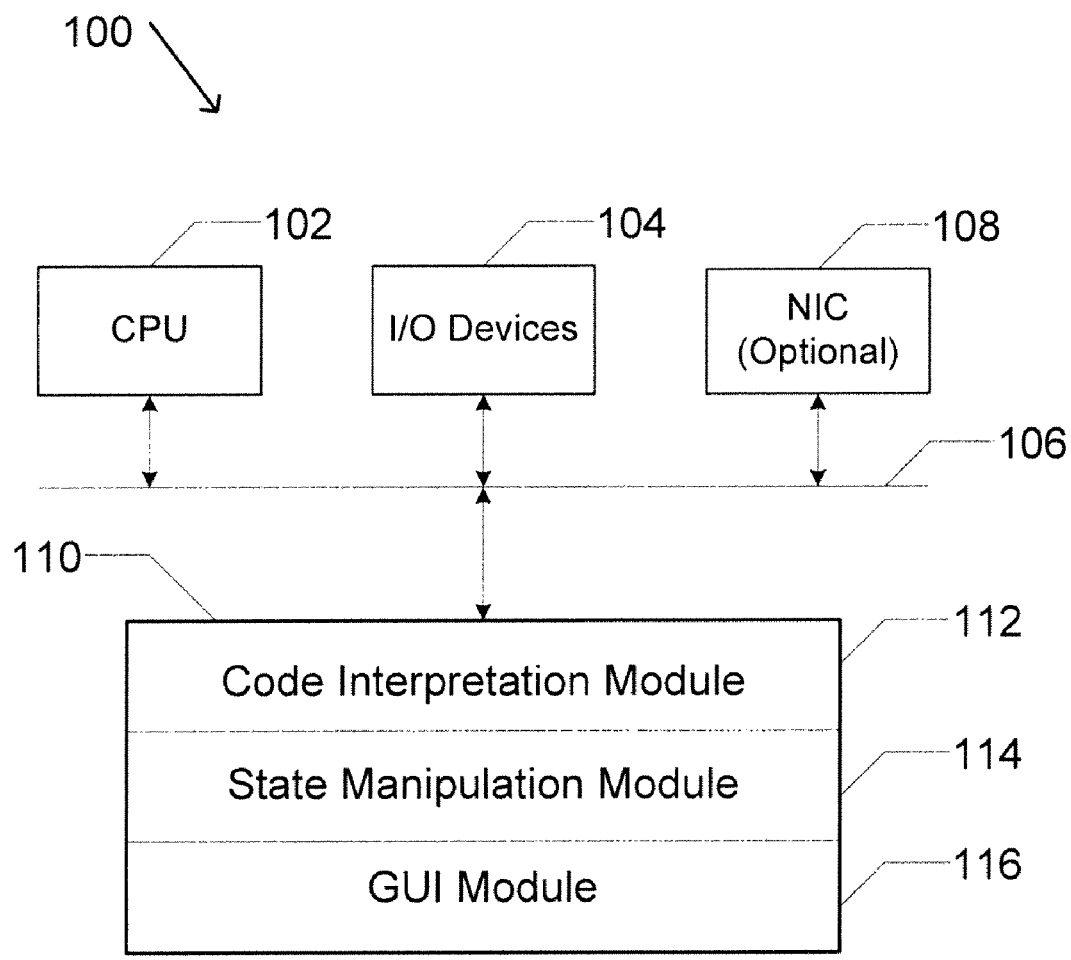
FIG. 1 illustrates a computer constructed in accordance with an embodiment of the invention.

FIG. 1 illustrates a computer 100 configured in accordance with an embodiment of the invention. The computer 100 includes standard components, including a central processing unit 102 and input/output devices 104, which are linked by a bus 106. The input/output devices 104 may include a keyboard, mouse, touch screen, monitor, printer, and the like. A network interface circuit 108 is also connected to the bus 106. The network interface circuit (NIC) 108 is an optional component that provides connectivity to a network (not shown), thereby allowing the computer 100 to operate in a networked environment.

A memory 110 is also connected to the bus 106. In an embodiment, the memory 110 stores one or more of the following modules: a code interpretation module 112, a state manipulation module 114 and a graphical user interface (GUI) module 116.

The code interpretation module 112 includes executable instructions to run the code segments, identify variables within the code and their associated states. The state manipulation module 114 includes executable instructions to save, load and replace variable states. The GUI module 116 may rely upon standard techniques to produce graphical components of a user interface, e.g., windows, icons, buttons, menu and the like.

The executable modules stored in memory 110 are exemplary. It should be appreciated that the functions of the modules may be combined. In addition, the functions of the modules need not be performed on a single machine. Instead, the functions may be distributed across a network, if desired. Indeed, the invention may be implemented in a client-server environment with various components being implemented at the client-side and/or the server-side. It is the functions of the invention that are significant, not where they are performed or the specific manner in which they are performed.

Figure 2:
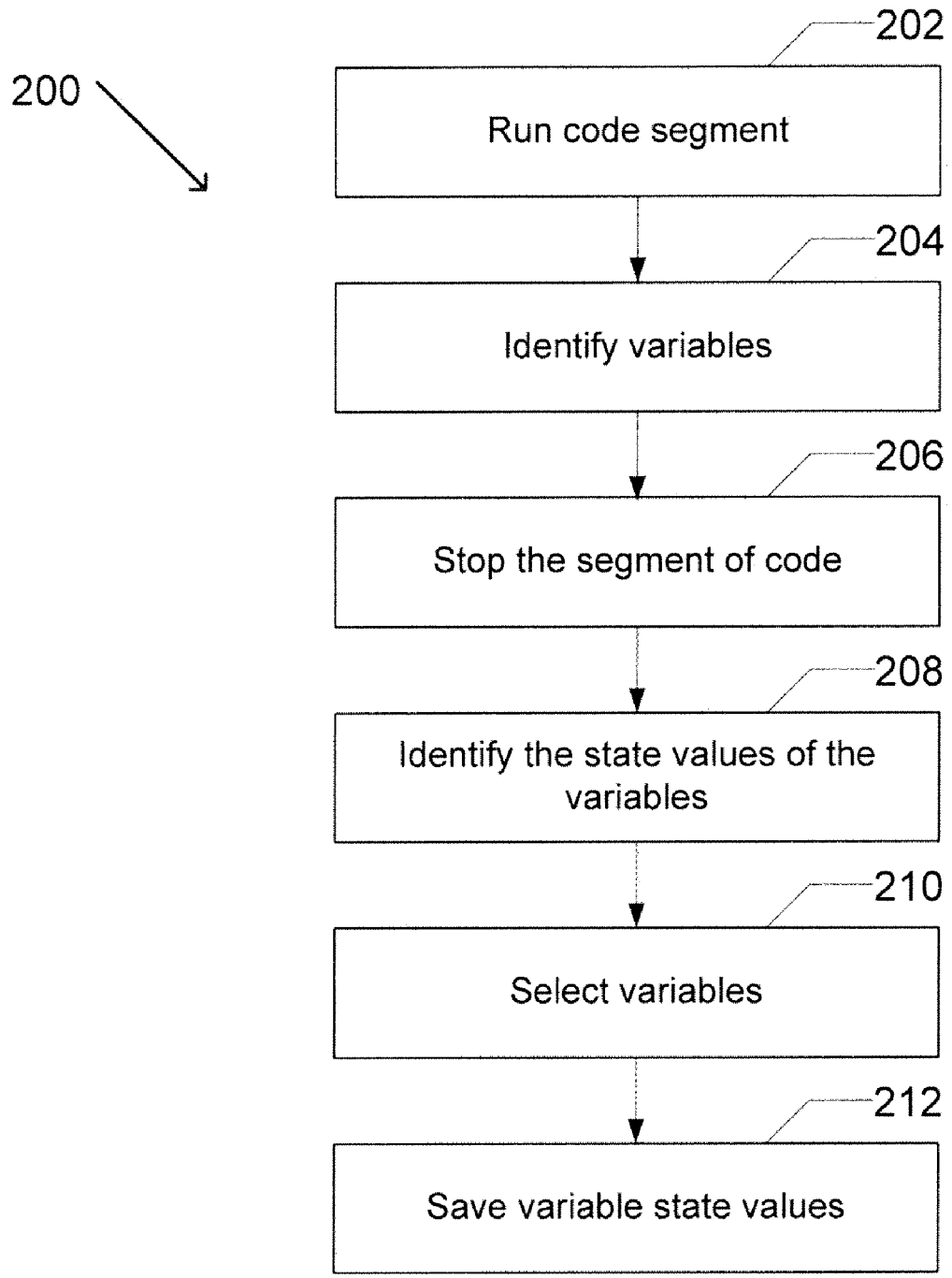
FIG. 2 illustrates processing operations associated with saving state variables in an embodiment of the invention.

FIG. 2 illustrates a high level workflow that may be implemented by the computer 100 of FIG. 1 while executing instructions from the code interpretation module 112 and the state manipulation module 114. The processing operations 200 illustrate a process of establishing and saving a variable state.

In the first processing operation 202, the code interpretation module 112 accepts a segment of code and starts running it. In an embodiment, the code segment is run in a development environment. As the code segment runs, the code interpretation module 112 identifies the current set of variables 204, updating the set as new variables are instantiated and existing variables are replaced. The code interpretation module 112 stops the segment of code at a predetermined breakpoint 206. In an embodiment, this breakpoint is either a specified point within the code segment or the end of the code segment. The code interpretation module 112 then identifies the state values for the previously identified variables 208. In an embodiment, the variables and corresponding state values are displayed to the user via the GUI module 116.

The state manipulation module 114 accepts a user selection of variables 210 via the GUI module 116. In an embodiment, all the variables are selected by default. In an embodiment, the user may select any combination of one or more variables. Once the desired variables have been selected, the associated variable states are saved 212 to a data store (e.g., a text file, a database, an XML file). In an embodiment, saving is initiated by a drag-and-drop, a right-click menu selection or a hotkey press. In an embodiment, the variable objects are serializable in order to be saved. In an embodiment, if they are not serializable, the user is notified and the process aborts. In an embodiment, the data store is specified by either a default value or the user.

Figure 3:
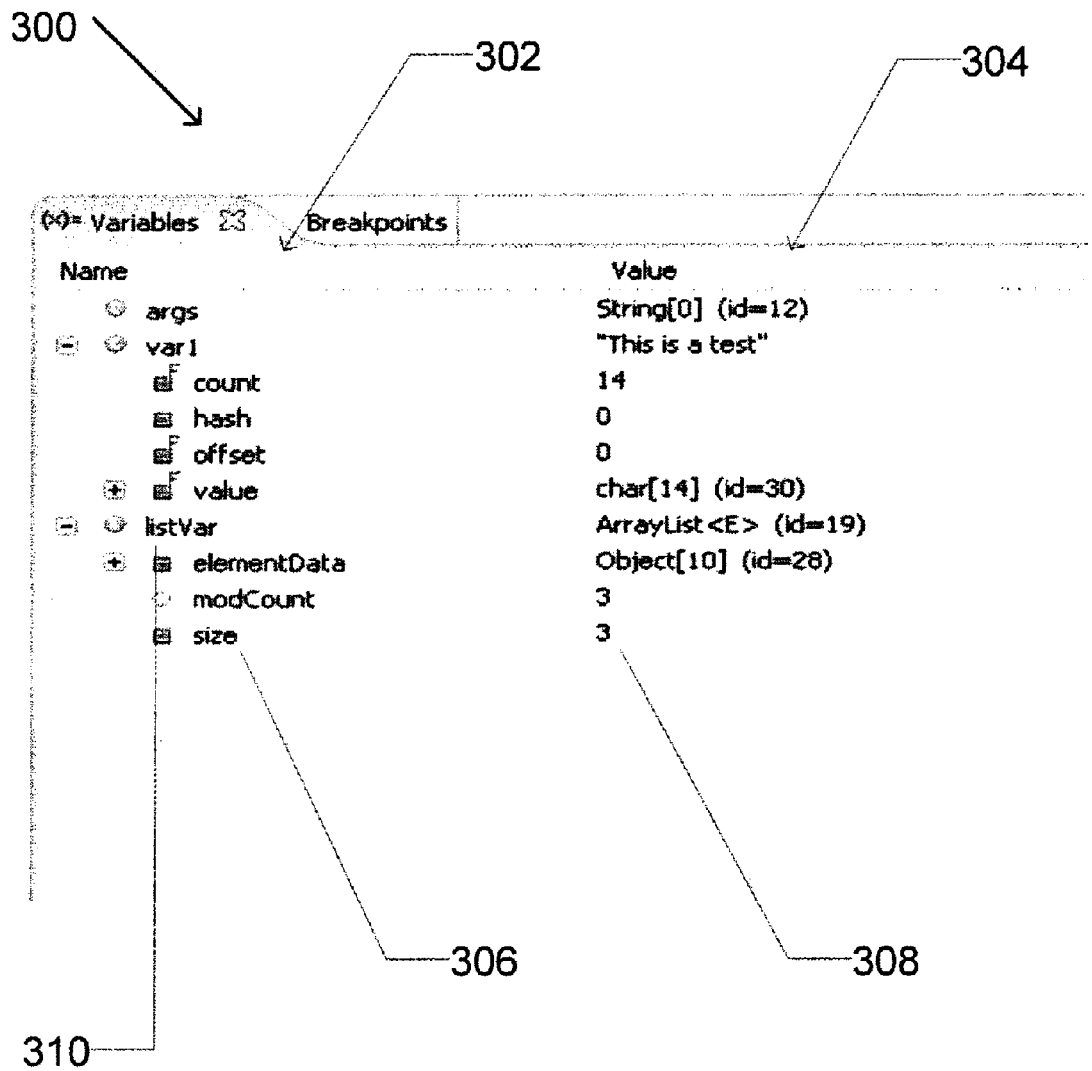
FIG. 3 illustrates a list of variables and their states configured in accordance with an embodiment of the invention.

FIG. 3 illustrates a panel 300 that displays a list of variables 302 and their state values 304 in accordance with an embodiment of the invention. Listed variables have state values associated with them, such as the variable "size" 306 which is associated with the value "3" 308. In an embodiment, all variables are accessible for selection, including object attribute variables. For example, "size" 306 is an attribute variable of the object variable "listVar" 310.

Figure 4:
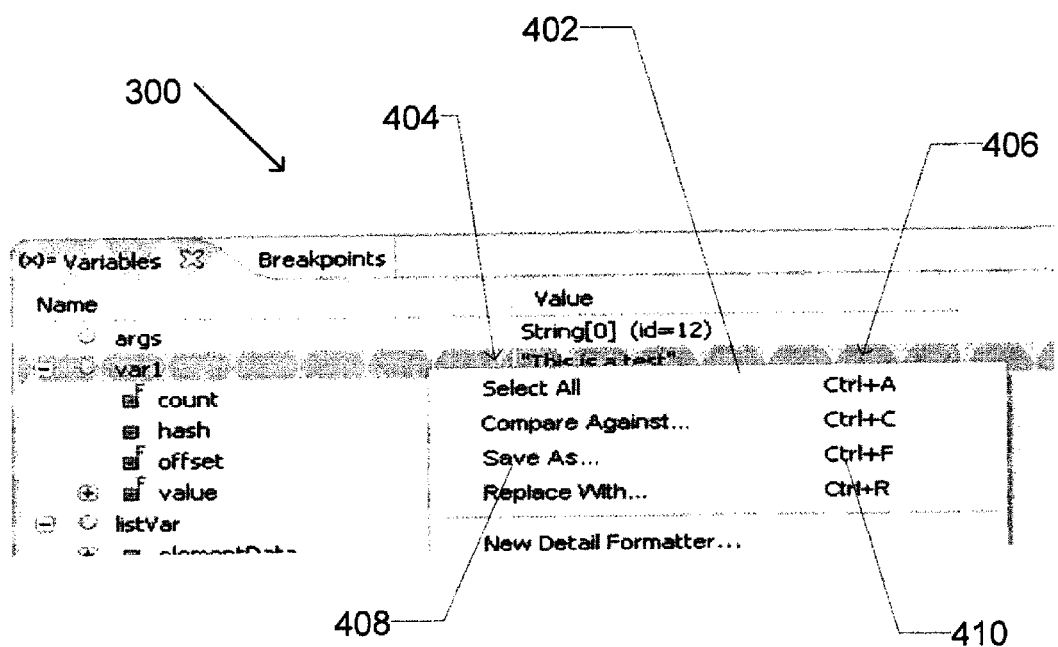
FIG. 4 illustrates a right-click menu in accordance with an embodiment of the invention.

FIG. 4 illustrates a right-click menu 402 in an embodiment of the invention. In an embodiment, the right-click menu 402 is accessible by right-clicking on a selected variable or anywhere within the panel 300. The right-click menu 402 provides the user with a number of context specific actions 404. To save, the user selects "Save As . . . " 408 from the right-click menu 402. In an embodiment, the actions 404 are associated with hotkeys 406, such as "Ctrl+F" 410 for "Save As . . . " 408, which is used in place of selecting from the right-click menu. In an embodiment, another alternative to the right-click menu is a drag-and-drop action. In an embodiment, drag-and-drop saving is performed by half-clicking on one of the selected variables and dragging to the location at which the state value is saved.

Figure 5:
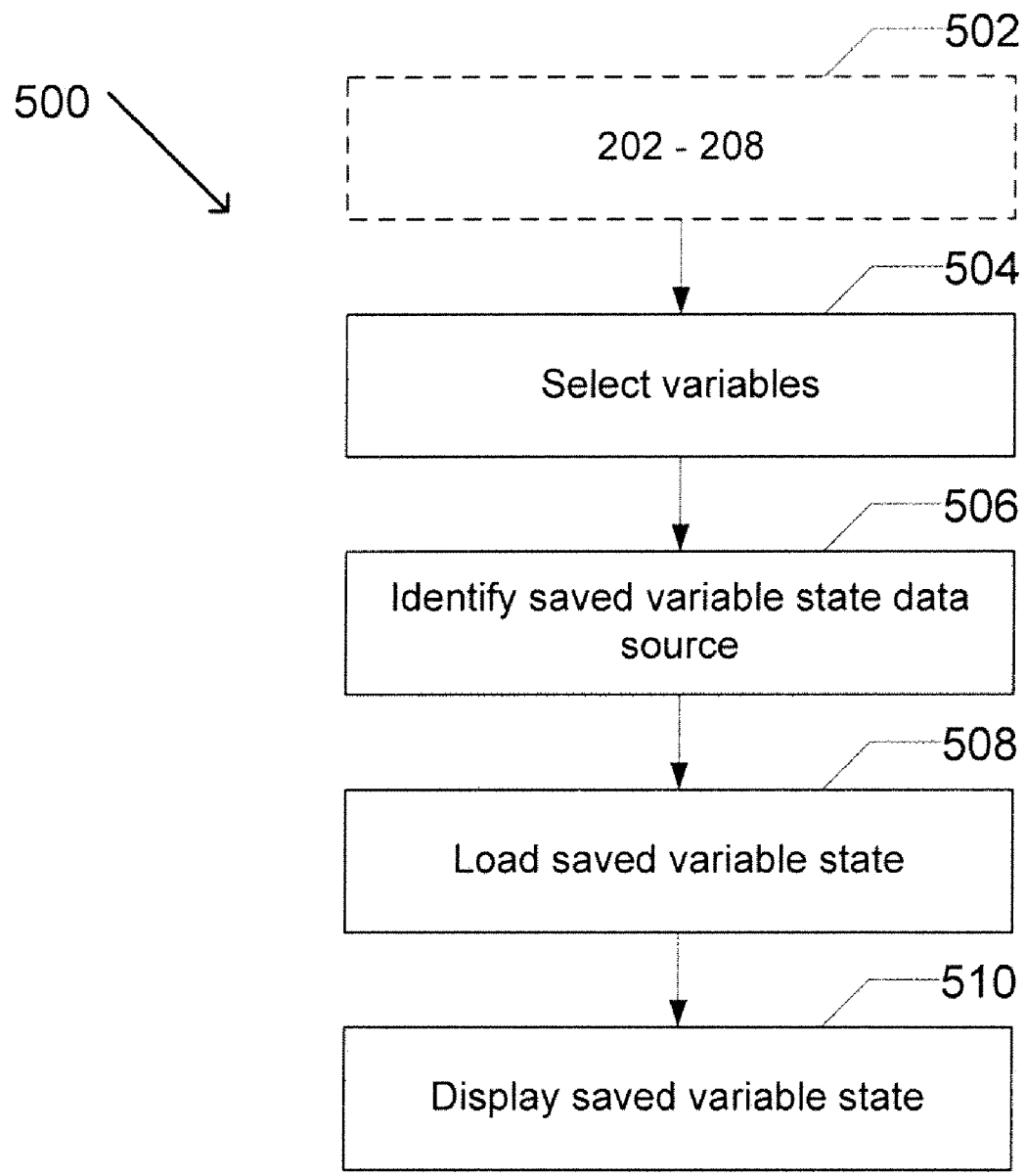
FIG. 5 illustrates processing operations associated with replacing or comparing state variables in an embodiment of the invention.

FIG. 5 illustrates a high level workflow that may be implemented by the computer 100 of FIG. 1 while executing instructions from the code interpretation module 112 and the state manipulation module 114. The processing operations 500 illustrate the process of establishing a variable state and either replacing it or comparing it with a saved variable state.

The processing operations 500 augment the processing operations 200 of FIG. 2. Operations 202-208 are performed 502 in the same fashion as previously described, resulting in a panel similar to panel 300 of FIG. 3. The state manipulation module 114 then accepts a user selection of variables 504 via the GUI module 116. This is similar to the processing operation 210 of FIG. 2 except that the user is selecting variables for which the related state values will be either replaced or compared with saved state values. In an embodiment, all variables are selected by default. In an embodiment, the user may select any combination of one or more variables. The state manipulation module 114 then identifies a saved variable state data source 506 (e.g., a text file, a database, an XML file). In an embodiment, the data source is either a default value or specified by the user. The state manipulation module 114 loads the saved variable state 508 and displays it 510 for state value replacement or comparison.

If the user requests a replace action, then the current state values for the selected variables are replaced with the corresponding saved state values, altering the current state of the code. Depending on the variables selected, all or some of the current state values are replaced. Furthermore, not all of the saved state values will necessarily be used; this is also dependent on the variables selected. When the segment of code resumes, the previously selected variables are in their saved state, and the remaining variables are in the same state as when the code stopped. If the user has requested a compare action, then the saved state values that correspond to the selected variables are displayed adjacent to the current state values. Not all of the saved state values will necessarily be used; this is dependent on the variables selected for comparison. In an embodiment, when replacing or comparing, if the saved state values do not correspond to the selected variables the user is notified.

Figure 6:
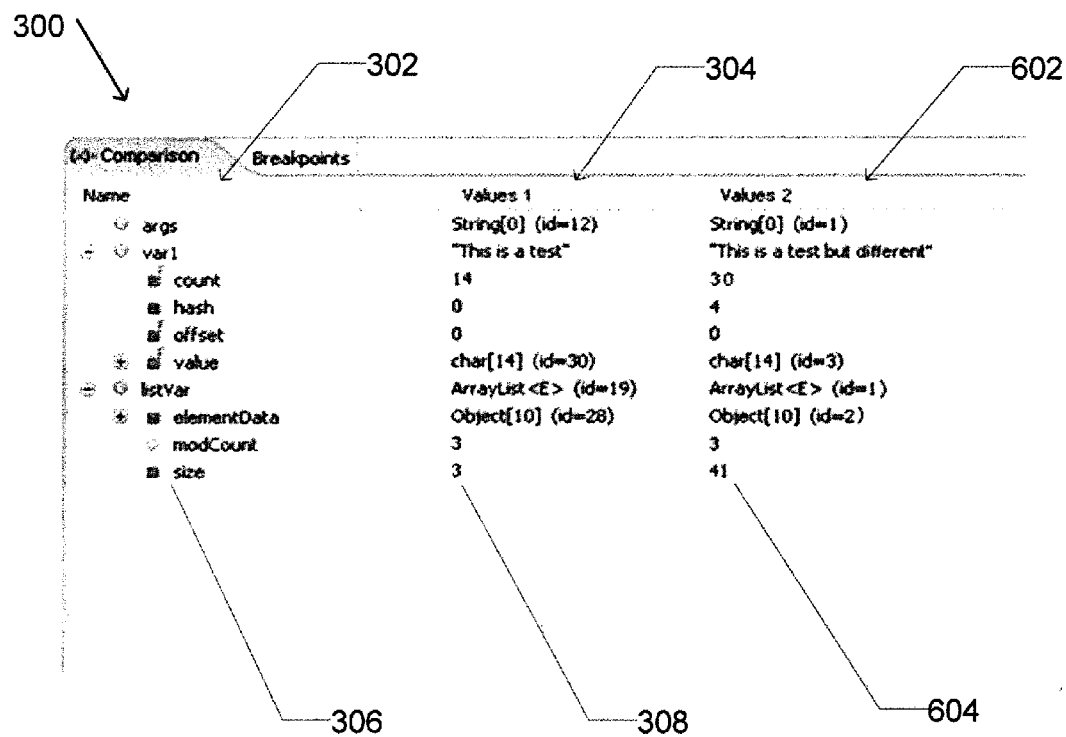
FIG. 6 illustrates a comparison of variable states in accordance with an embodiment of the invention.

FIG. 6 illustrates a panel 300 displaying the comparison of two variable states 304 and 602 in accordance with an embodiment of the invention. For example, the variable "size" 306 has the current state "3" 308 and corresponds to the saved state "41" 604. In an embodiment, the variable names 302, the current state values 304 and the saved state values 602 are displayed adjacent to each other in a single panel. In an embodiment, the current state values 304 and the saved state values 602 are displayed in separate panels.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer readable storage medium, comprising executable instructions to:
    run a segment of code;
    identify a plurality of variables that are associated with the segment of code;
    stop the segment of code at a predetermined breakpoint;
    identify a plurality of current state values that correspond to the plurality of variables associated with the predetermined breakpoint;
    accept a selected variable from the plurality of variables via a first interaction with a Graphical User Interface;
    accept a saved variable state from a data source, wherein the saved variable state comprises a set of saved state values corresponding to a state of a previously run segment of code;
    trigger an operation selected from replacing a current state value in the plurality of current state values and comparing a current state value in the plurality of current state values, wherein:
        the current state value for the selected variable is replaced with the corresponding saved state value when the operation of replacing is selected:
        the current state values that correspond to the saved state values are displayed adjacent to each other, when the operation of comparing is selected, wherein the display is in a single panel or in separate panels; and
        the operation is triggered via a second interaction with the Graphical User Interface; and
        the first interaction with the Graphical User Interface and the second interaction with the Graphical User Interface constitute a single interaction with the Graphical User Interface.

2. The computer readable storage medium of claim 1, wherein the data source is selected from one or more of a default value and a user input.

3. The computer readable storage medium of claim 1, wherein the executable instructions to trigger include executable instructions to trigger a user notification when the selected variable does not correspond to one of the set of saved state values.

4. The computer readable storage medium of claim 1, wherein a the first interaction with the Graphical User Interface and the second interaction with the Graphical User Interface are selected from at least one of a right-click menu selection, a drag-and-drop and a hotkey press.

* * * * *